United States Patent

[11] 3,575,468

| [72] | Inventor | Harley L. Kapanka |
| | | Utica, Mich. |
| [21] | Appl. No. | 847,840 |
| [22] | Filed | Aug. 6, 1969 |
| [45] | Patented | Apr. 20, 1971 |
| [73] | Assignee | Genral Motors Corporation |
| | | Detroit, Mich. |

[54] VEHICLE WHEEL COVER
3 Claims, 3 Drawing Figs.

[52] U.S. Cl. .................................................... 301/37
[51] Int. Cl. ............................................... B60b 7/06
[50] Field of Search ............................................ 301/37, 108

[56] References Cited
UNITED STATES PATENTS

| 1,432,191 | 10/1922 | Lachman.................... | 301/37(SS) |
| 2,689,770 | 9/1954 | Pipes........................... | 301/37 |
| 2,746,805 | 5/1956 | Gamundi..................... | 301/37 |
| 3,268,262 | 8/1966 | Gonas.......................... | 301/37(SS) |
| 3,317,248 | 5/1967 | Dully............................ | 301/37 |

*Primary Examiner*—Richard J. Johnson
*Attorneys*—Warren E. Finken and Arthur N. Krein ABSTRACT: A vehicle wheel cover assembly having a spring retention device for releasably securing a wheel cover to a wheel by means of a formed annular wire spring comprising sets of outer cover-engaging segments, sets of which are interconnected by inner cover-engaging segments with a plurality of reentrant axial segments interconnecting the outer cover-engaging segments with outer wheel-engaging segments and, with inner wheel-engaging segments connected to the outer wheel-engaging segments by reentrant radial segments all formed integrally as part of the wire spring.

PATENTED APR 20 1971

3,575,468

INVENTOR.
Harley L. Kapanka
BY
Arthur N. Krein
ATTORNEY

VEHICLE WHEEL COVER

This invention relates to wheel covers and, more particularly, to a wheel cover of the type adapted to be detachably applied to a vehicle wheel. In its applied position, the wheel cover extends over a substantial portion of the outer side of the wheel providing both a protective shield and an ornamental trim for the wheel.

Accordingly, an object of this invention is to improve wheel cover retention devices whereby the wheel cover can be readily attached to and detached from the vehicle wheel. Another object of this invention is to improve wheel cover retention devices whereby a spring wire ring-carrying spaced retaining elements thereon engage separate portions of the wheel cover and separate portions of the vehicle wheel.

These and other objects of the invention are attained by means of an annular spring wire ring provided with a plurality of outer cover-engaging segments adapted to be secured to a wheel cover at spaced peripheral portions thereof; sets of outer cover-engaging segments of the wire being interconnected by inner cover-engaging segments which engage spaced inner portions of the wheel cover. The spring wire ring also includes a plurality of axial segments interconnecting the outer cover-engaging segments with outer wheel-engaging segments adapted to engage a groove in the tire rim of the wheel; and, inner wheel-engaging segments adapted to engage tabs on the hub of the wheel are connected to the inner wheel-engaging segments by radial segments.

For a better understanding of the invention, as well as other objects and further features thereof, reference is had to the following detailed description of the invention to be read in connection with the accompanying drawings, wherein.

Figure 1:
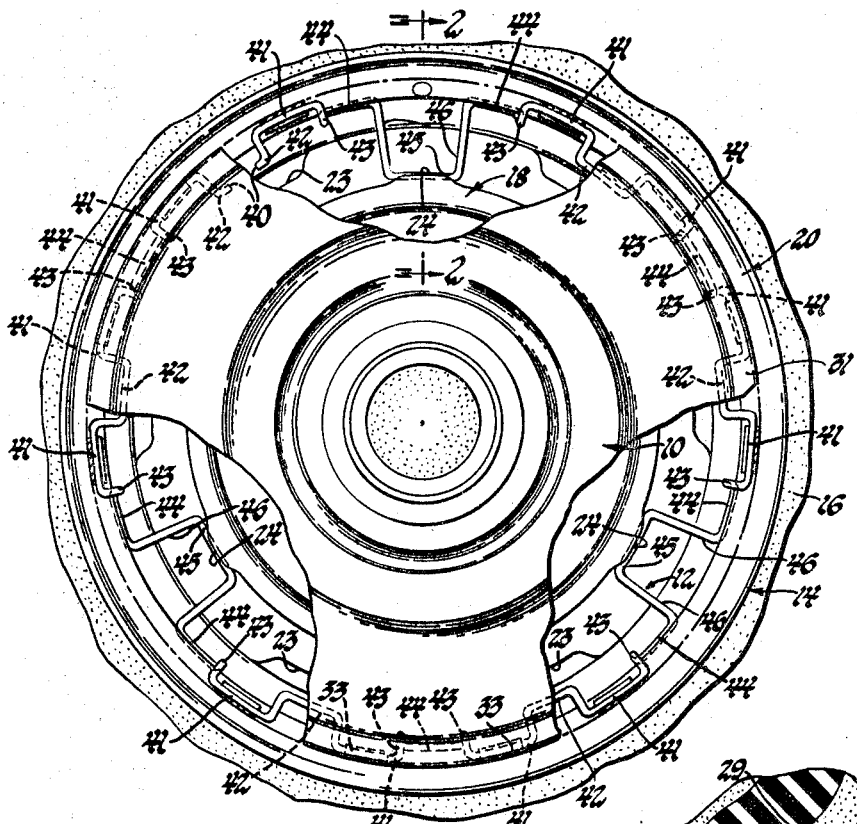
FIG. 1 is a front elevational view of a wheel cover applied to a vehicle wheel-employing the wheel cover spring retention device of the invention, part of the wheel cover being broken away to show details of the spring retention device.
Figure 3:
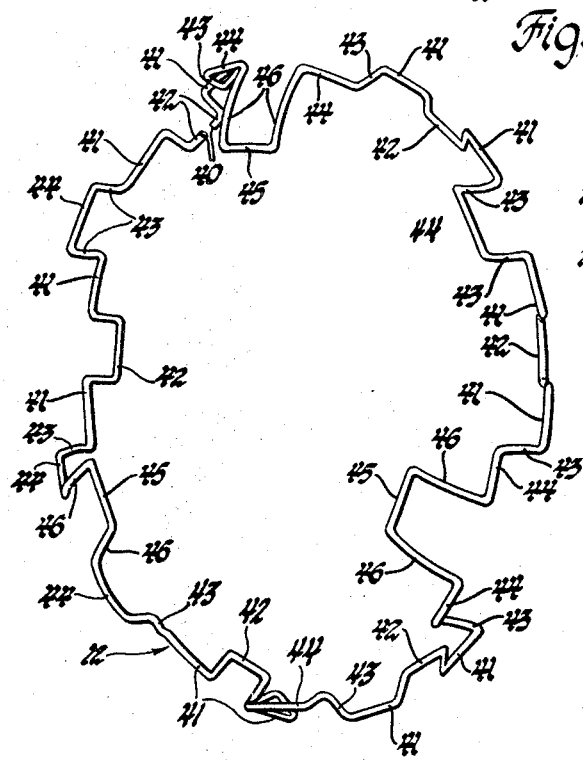
FIG. 3 is a perspective view of the wheel cover retention spring.
Figure 2:
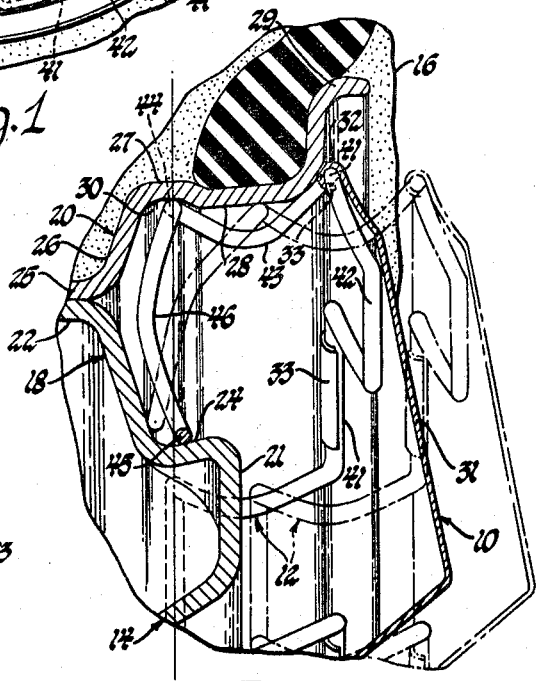
FIG. 2 is a sectional view taken along line 2-2 of FIG. 1.

As shown in FIGS. 1 and 2, a wheel cover 10 is releasably secured by spring retention device 12 to a vehicle wheel 14, the wheel cover extending over and covering a substantial portion of the front or outer side of the vehicle wheel.

The vehicle wheel 14 is a conventional wheel of the type used on motor vehicles adapted to be equipped with a pneumatic tire 16. The vehicle wheel 14 includes a disc spider wheel body 18 carrying a drop center, multiflange tire rim 20. The wheel body 18 has the usual central bolt-on flange, not shown, an annular outwardly projecting nose bulge or hub 21 and, peripherally, an annular axially extending flange 22 by means of which the wheel body 18 is secured, as by welding, to the inner side of the tire rim 20. At spaced intervals, the flange 22 is inset to provide openings 23 through the wheel body at the juncture with the tire rim. Annular outwardly projecting nose bulge or hub 21 is provided at spaced positions on the periphery thereof with radially extending spring-retaining portions 24, three of these being shown in the embodiment illustrated to form with the hub an interrupted axially extending, radially outwardly opening annular groove in which a portion of the spring retention device 12 is to be retained, as described in detail hereinafter.

The tire rim 20, only the outboard portion of which in terms of its use on a vehicle is shown, defines an outwardly opening channel recess formed by a center annular flange 25 which merges with a side flange 26 facing generally axially and radially outward. An annular connector 27 connects the side flange 26 to intermediate flange 28 merging with terminal flange 29, these elements providing a circumferential groove in the tire rim in which the bead of the tire 16 seats; with the annular connector 27 and intermediate flange 28 defining an axially extending concave internal annular groove 30, inboard of terminal flange 29, confronting the interrupted axially extending groove formed by spring-retaining portions 24 and hub 21 of the wheel body.

The wheel cover 10 comprises, in general, an outwardly dished circular sheet metal disc 31 provided with a peripheral bead 32, the latter having at spaced intervals thereon extension tabs 33 which are bent or spun over to provide, with the adjoining portion of the bead, spring-retaining clips, the remainder of the peripheral bead forming on the inner side thereof a groove. As is well known in the art, the disc 31 can have any ornamental configuration and may be provided with air intake openings and a simulated hub cap, as desired.

The spring retention device 12, formed for example from spring seat wire is, in the embodiment disclosed, a split substantially annular wire ring sinuously bent to provide a plurality of circumferentially arranged loop-shaped outer cover-engaging segments 41, pairs of which are interconnected by circumferentially arranged inner cover-engaging segments 42. A plurality of bent reentrant axial segments 43 interconnect the outer cover-engaging segments 41 with circumferentially arranged outer wheel-engaging segments 44 and then circumferentially arranged inner wheel-engaging segments 45 are connected to the outer wheel-engaging segments 44 by bent reentrant radial segments 46. As shown, the ring is split at 40 centrally of one of the inner cover-engaging segments 42 thereby still effectively retaining the function of this particular segment and thus eliminating any need to weld the two ends together, although this could be done if desired. The wire is bent so that like elements, such as outer cover-engaging segments 41 lie in a common plane with respect to each other.

The spring retention device 12 is mounted to the wheel cover 10 with the outer cover-engaging segments 41 snapped into engagement with the groove formed by the bead 32 of the cover and by bending or spinning over the tabs 33 to embrace the outer cover-engaging segments 41.

When the spring retention device 12 is thus secured to the wheel cover 10, the inner cover-engaging segments 42 contact the innerside of disc 31 of the wheel cover to be fulcrumed against it to thereby urge the outer wheel-engaging segments 44 via the reentrant axial segments 43 radially outward whereby in a free position they would describe a circle which has a diameter greater than the inside diameter of annular recess 30 of the tire rim 20. Thus when the wheel cover 10 is to be mounted to the wheel, the outer wheel-engaging segments 44 must be sprung inwardly toward each other to be received on the underside of intermediate flange 28, the position shown by broken lines in FIG. 2, before being pushed into the annular recess 30 where they are then forced into resilient frictional engagement with the underside of annular connector 27 since the inner cover segments 42 are being held against torsional forced movement by the innerside of disc 31 of wheel cover 10. In addition, the outer wheel-engaging segments 44 are also held against the underside of intermediate flange 28 by the resistance of the entire length of wire to twisting.

Still further retention is obtained by the overcenter-type reaction obtained when the inner wheel-engaging segments 45 are snapped into the spring-retaining portions 24 of the wheel body 18. This is accomplished by forming reentrant radial segments 46 and inner wheel-engaging segments 45 so that, in the free position of these elements, as seen by the broken lines in FIG. 2, the inner wheel-engaging segments 45 are positioned in a plane inboard or to the left of the outer wheel-engaging segments 44 as seen in the same FIG. As the wheel cover is pressed to the left to the attached and deformed position shown, inner wheel-engaging segments 45 contact the outer face of wheel body 18 and, in effect, are then pivoted counterclockwise about the adjoining outer wheel-engaging segments to an overcenter position with respect to the outer wheel-engaging segments 44, that is, to a position outboard or to the right of the latter segments as seen in FIG. 2. At the same time the reentrant radial segments 46 are bent to compress them so that they will bias the inner wheel-engaging segments 46 and outer wheel-engaging segments 44 against the hub portion of the wheel body and against the underside of annular connector 27 of the tire rim 20, respectively. With the overcenter relationship between the inner wheel-engaging segments 45 and the outer wheel-engaging segments 44, torsional forces will now be applied against the inner wheel-engaging segments 45 to tend to move them outboard and, torsional forces are also applied against the outer wheel-engaging segments 44, to tend to move them inboard thereby firmly pulling and retaining the wheel cover 10 against the wheel.

From the foregoing description, it is apparent that the spring retention device 12 is fastened to the wheel cover 10, which in turn will be securely held in place on the vehicle wheel 14 when applied thereto, but which can be removed, whenever desirable, by the simple application of a suitable prying force.

While the invention has been described with reference to the structures disclosed herein, it is not confined to the details set forth, and this application is intended to cover such modifications or changes as may come within the purposes of the improvements or the scope of the following claims.

I claim:

1. In a wheel structure having confronting spaced axially extending groove means therein, and a cover for disposition over the outer side of said wheel structure, said cover having peripherally spaced wire-retaining means; a spring retention device including an annular wire member having circumferentially spaced sets of outer cover-engaging segments, circumferentially spaced inner cover-engaging segments connecting the said outer cover-engaging segments of a set together, outer wheel-engaging segments, axial segments connecting said outer cover-engaging segments with said outer wheel-engaging segments, inner wheel-engaging segments, radially extending segments connecting said outer wheel-engaging segments with said inner wheel-engaging segments, said outer cover-engaging segments being positioned and retained in said peripherally spaced wire-retaining means of said cover with said inner cover-engaging segments engaging said cover, said outer wheel-engaging segments and said inner wheel-engaging segments being engaged in said groove means of said wheel structure in confronting relation with respect to each other and in an overcenter sprung relation with respect to each other.

2. A wheel cover assembly adapted for attachment to a vehicle wheel comprising a disclike wheel cover having a peripheral edge bead with spaced wire-retaining tabs thereon, a wire spring-retaining member annular in form and including circumferentially spaced sets of outer cover-engaging segments; circumferentially spaced inner cover-engaging segments connecting said outer cover-engaging segments of a set together; outer wheel-engaging segments; reentrant axial segments connecting said outer cover-engaging segments with said outer wheel-engaging segments; radially inner wheel-engaging segments; and, reentrant radial segments connecting said outer wheel-engaging segments with said inner wheel-engaging segments, said outer cover-engaging segments being positioned within said peripheral edge bead of said wheel cover and secured thereto by said tabs.

3. A spring retention device for use in securing a wheel cover to a vehicle wheel, said spring retention device including a substantially annular wire member provided with radially outer circumferentially spaced circumferentially extending sets of cover-engaging segments, circumferentially spaced radially inner cover-engaging segments connecting said outer cover-engaging segments of a set together, radially outer wheel-engaging segments, axial segments connecting said outer cover-engaging segments with said outer wheel-engaging segments, radially inner wheel-engaging segments and, radially extending segments connecting said outer wheel-engaging segments with said inner wheel-engaging segments, with said inner wheel-engaging segments positioned in a plane spaced from said outer wheel-engaging segments.